Figure 1:
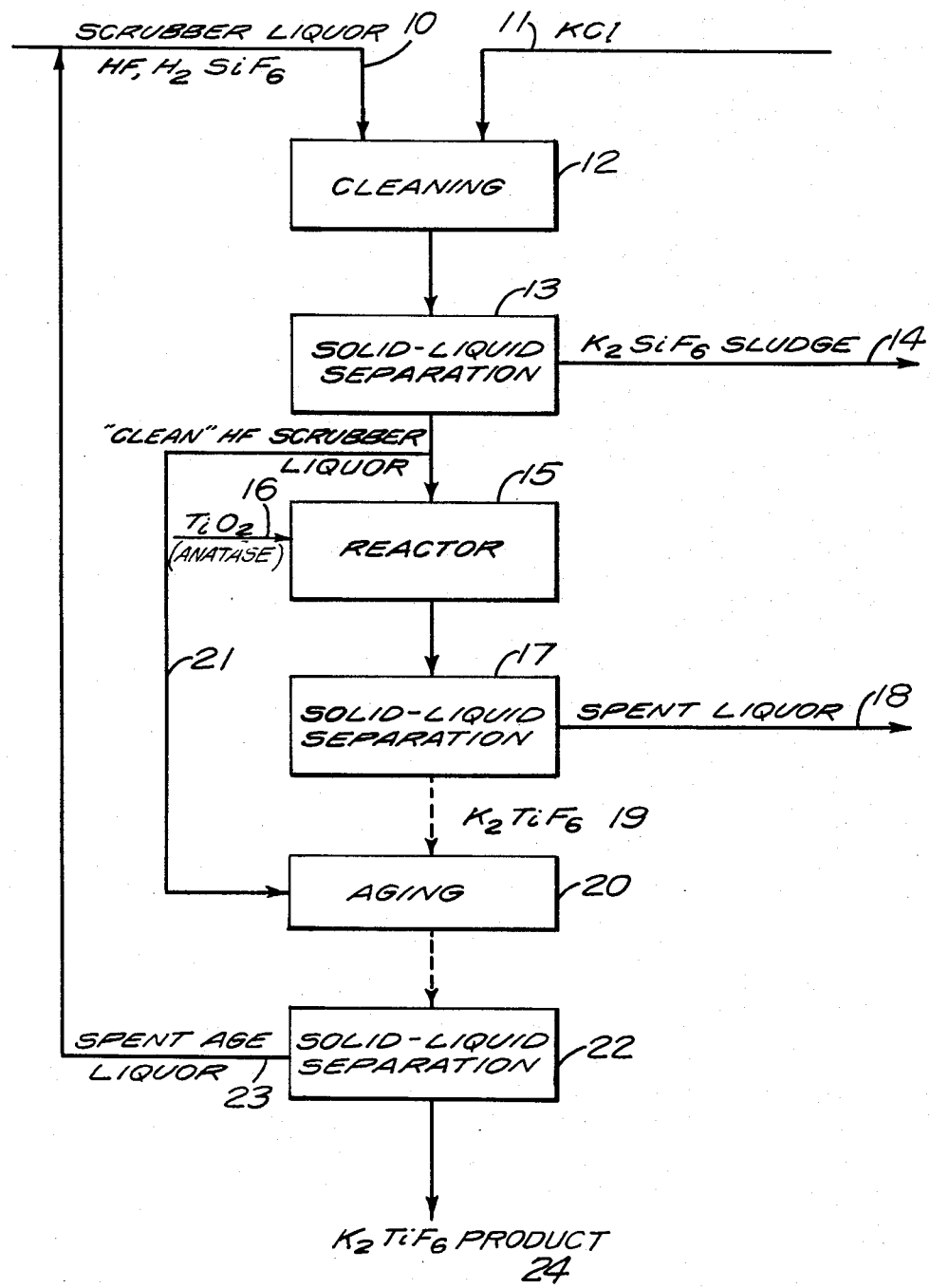

United States Patent [19]

Kramer et al.

[11] Patent Number: 4,497,779
[45] Date of Patent: Feb. 5, 1985

[54] PRODUCTION OF POTASSIUM HEXAFLUOTITANATES USING DILUTE HYDROFLUORIC ACID

[75] Inventors: Marcy J. Kramer, Arvada, Colo.; William C. Warneke, Lakeland, Fla.; Gustavo A. Meyer, Creve Coeur, Mo.; Mahesh C. Jha, Arvada

[73] Assignee: Amax Inc., Greenwich, Conn.

[21] Appl. No.: 541,830

[22] Filed: Oct. 14, 1983

[51] Int. Cl.³ .............................................. C01G 23/02
[52] U.S. Cl. .................................... 423/72; 423/341; 423/465; 423/85
[58] Field of Search ............................ 423/72, 85, 464

[56] References Cited

U.S. PATENT DOCUMENTS 1,501,587  7/1924  Doremus ........................... 423/72
2,568,341  9/1951  Kawecki et al. ................... 423/72

FOREIGN PATENT DOCUMENTS 1044025  9/1966  United Kingdom ................ 423/72

Primary Examiner—Herbert T. Carter
Attorney, Agent, or Firm—Michael A. Ciomek; Eugene J. Kalil

[57] ABSTRACT

A process is provided for recovering fluorine from dilute hydrofluoric acid solutions, such as waste scrubber solution obtained in the treatment of phosphates. The dilute solution is used to react with oxidic titanium material to solubilize the contained titanium and subsequently form, in the presence of potassium ions, crystals of $K_2TiF_6$ which are commercially useful as a grain-refining agent in the manufacture of aluminum alloys.

11 Claims, 3 Drawing Figures

PRODUCTION OF POTASSIUM HEXAFLUOTITANATES USING DILUTE HYDROFLUORIC ACID

The present invention relates to the recovery of fluorine from dilute hydrofluoric acid solutions, such as waste mill streams and, in particular, to the conversion of fluorine into a marketable product, for example, to the production of potassium hexafluotitanate ($K_2TiF_6$) useful in the manufacture of master alloys used in the production of aluminum.

BACKGROUND OF THE INVENTION

In certain metallurgical and chemical processes in which fluoride-containing raw materials are treated, HF is obtained as a by-product which, because of environmental regulations, must be controlled so as not to pollute the immediate environment.

For example, during the defluorination of phosphate rock, as practiced in the phosphate industry, HF gas is evolved. Because of environmental regulations, the gas from defluorination reactors is thoroughly scrubbed to remove the HF before its discharge into the atmosphere. Normally, water is used for scrubbing which results in a dilute hydrofluoric acid solution. The strength of the hydrofluoric acid produced generally depends on the type of scrubbing system used. In current practice, such waste solutions may contain from 1 to 8 percent HF. The concentration could be conceivably higher by employing several stages in a countercurrent system. Obviously, as environmental regulations regarding fluoride emissions become more stringent, disposal of the acid becomes more critical. While one method is to simply neutralize the HF and then throw it away, this procedure is expensive and undesirable. The liquor is too dilute and contaminated with impurities such as silicon and phosphorus to market as commercial hydrofluoric acid. Thus, it would be desirable to develop a process to recover the fluoride as a marketable compound, thereby utilizing a cheap source of fluoride while solving disposal problems.

A fluoride compound which may be produced from dilute hydrofluoric acid is potassium hexafluotitanate ($K_2TiF_6$), a chemical which may be employed as an addition agent for molten baths of aluminum in which the titanium serves as a grain refining agent.

For this particular application, $K_2TiF_6$ should meet specifications for certain chemical and physical characteristics. It is important that the product be dry and granular for safe and easy addition to a molten bath. As discussed herein, $K_2TiF_6$ can be produced either as hydrated crystals or as anhydrous crystals. The hydrated crystals can be dried to remove the chemically combined water and to obtain the anhydrous form. However, this process generates a very fine product which may cause dusting problems. Coarse anhydrous crystals are preferred in that they are denser and stronger than the hydrated form. It is important to keep the impurity contents such as $TiO_2$, iron, and silicon at very low levels.

It should be noted that several processes have been patented in the past for the manufacture of $K_2TiF_6$ but few have been commercialized due to the requirements for expensive reagents or severe operating conditions. One such process, disclosed in U.S. Pat. No. 2,717,197, suggests reacting potassium fluoride dissolved in commercial hydrofluoric acid with titanium tetrachloride at temperatures up to 70° C., and cooling to room temperature to crystallize $K_2TiF_6$. The product obtained was "finely crystalline". In another process disclosed in U.S. Pat. No. 2,694,616, a $TiO_2$ source is mixed with a potassium salt and coke and calcined at 1800° F. The sintered calcine is crushed to $-200$ mesh and then reacted with liquor containing KCl and $CaF_2$. Sulfuric acid is next added to lower the pH to 3–5, and the slurry is maintained at boiling as calcium sulfate is precipitated. After removal of $CaSO_4$, the filtrate is concentrated by evaporation, and the $K_2TiF_6$ then crystallized. Other processes involve reacting titanium sulfate with fluoride solutions containing KF or $CaF_2$, as described in U.S. Pat. No. 2,475,287.

Present commercial practice for the production of potassium hexafluotitanate (U.S. Pat. No. 2,568,341) involves the dissolution of a titaniferous source, generally ilmenite, in concentrated hydrofluoric acid. Ferric ions in solution after the digestion stage are reduced by the addition of scrap iron, so that precipitation of insoluble $K_3FeF_6$ may be avoided. The titanium and iron-bearing fluoride solution is separated from the insolubles. After heating the liquor to at least 70° C., a potassium salt, preferably chloride or nitrate, is added. At some point prior to crystallization, sulfuric acid, in an amount ranging from 5 to 50 percent of the HF used, is added to promote formation of large crystals. The liquor is cooled to ambient temperature to produce crystals of $K_2TiF_6$. The crystals are filtered, washed with cold water, and dried at about 100° C. in a conventional drying oven.

The main shortcomings of the existing commercial practice is the need to use concentrated hydrofluoric acid and the use of sulfuric acid to aid crystallization. Although both acids are available commercially in concentrated form, they are expensive and add considerably to the cost of the $K_2TiF_6$ production. The process of the present invention overcomes these shortcomings. The hydrofluoric acid source may be a dilute solution or a waste stream of dilute HF from the phosphate industry. Large anhydrous crystals can be obtained by either aging the hydrated crystals in the dilute hydrofluoric acid or by providing anhydrous $K_2TiF_6$ crystals as seed, thus eliminating the need for sulfuric acid.

OBJECTS OF THE INVENTION

It is an object of the invention to provide a process for the recovery of fluorine from dilute hydrofluoric acid solutions, such as waste mill streams obtained in the defluorination of phosphate rock.

Another object is to provide a process for the recovery of fluorine from dilute hydrofluoric acid solutions in the form of a marketable product of $K_2TiF_6$.

A still further object is to provide a process of producing anhydrous crystals of $K_2TiF_6$ from dilute hydrofluoric acid solutions substantially free of such impurities as $TiO_2$, silicon and iron.

Figure 2:
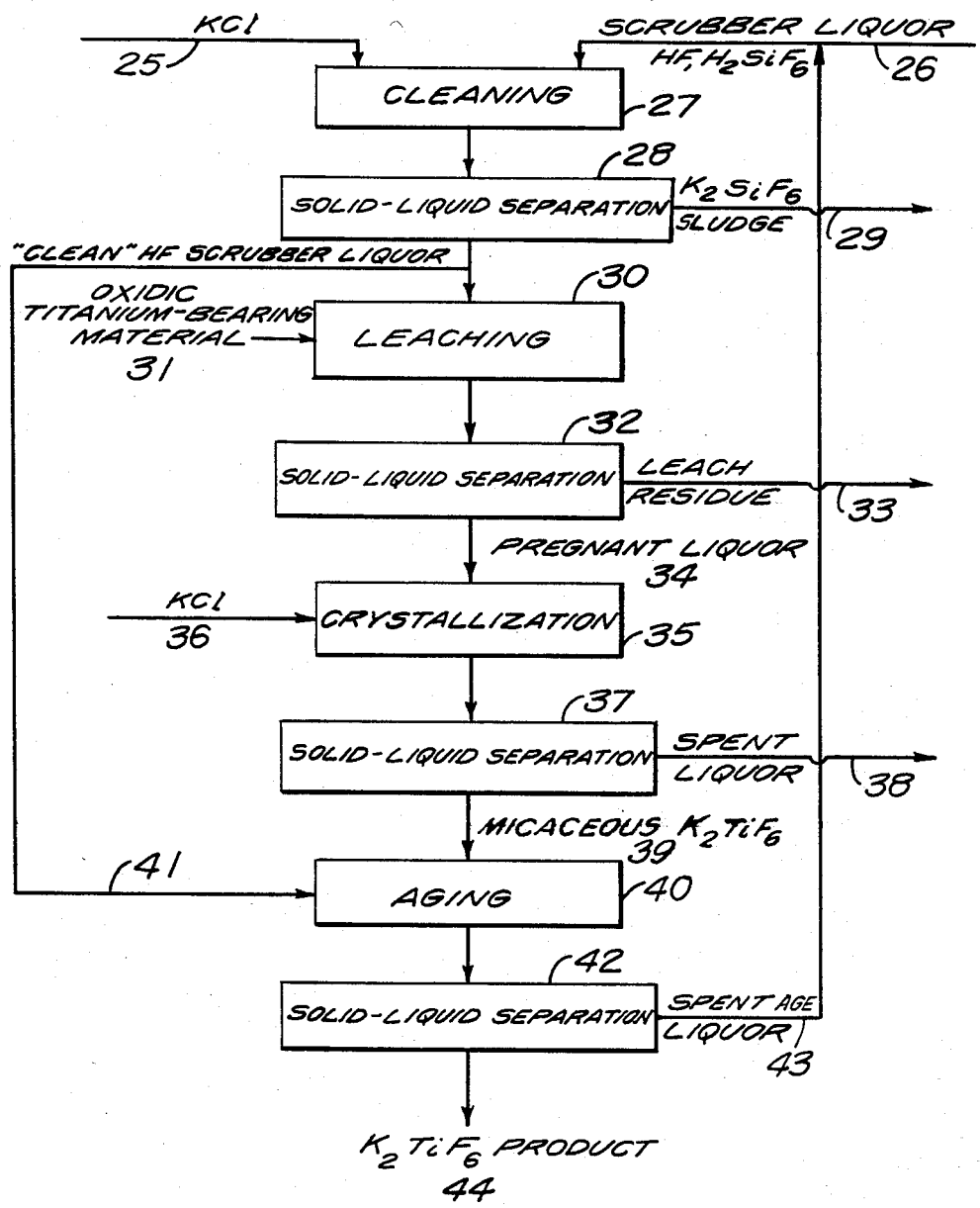
Figure 3:
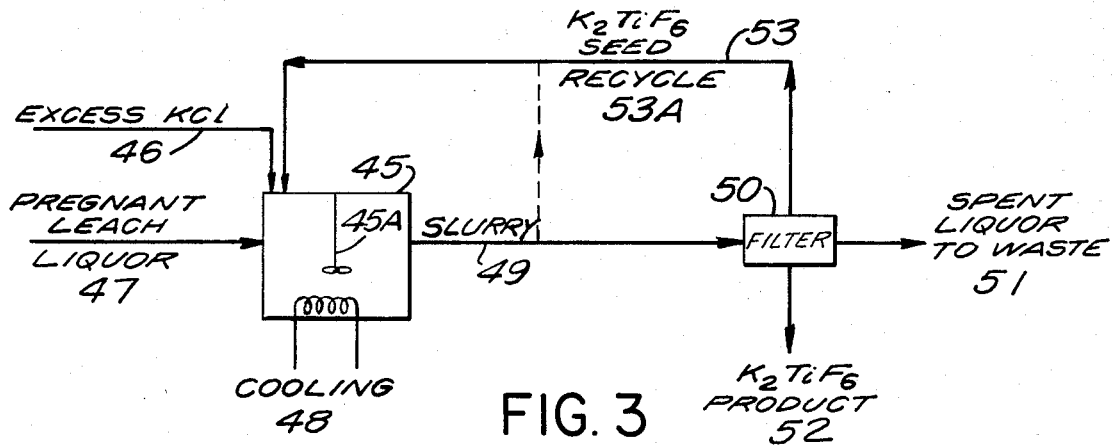

These and other objects will more clearly appear when taken in conjunction with the following disclosure, the appended claims and the accompanying drawings, wherein FIG. 1 is a flow sheet of one embodiment of the invention for converting HF to $K_2TiF_6$ using substantially pure anatase as the source of titanium;

FIG. 2 is another embodiment of the invention suitable for the continuous production of $K_2TiF_6$ from impure titanium oxide; and FIG. 3 is illustrative of an embodiment of the invention in which anhydrous crystals of $K_2TiF_6$ are produced directly by using $K_2TiF_6$ crystals as seed material.

SUMMARY OF THE INVENTION

In the production of $K_2TiF_6$ from dilute hydrofluoric acid solutions, such as waste solutions obtained in chemical processes, the source of titanium may comprise pure anatase ($TiO_2$), $TiO_2$-rich intermediates, such as ilmenite concentrates, or other oxidic titanium material containing at least about 25% titanium by weight. Substantially pure $TiO_2$ contains about 60% Ti by weight. Ilmenite in the pure state contains about 31.6% titanium by weight; however, as a metallurgical concentrate containing impurities it may contain less than that amount of titanium. Thus, the invention is applicable to oxidic titanium material containing at least about 25% Ti.

In its broad aspects, the invention is directed to the recovery of fluorine from aqueous solution containing dilute amounts of hydrofluoric acid of at least about 3% HF and mixing an amount of said solution with a predetermined amount of an oxidic titanium material containing by weight at least about 25% titanium to form a slurry thereof.

The slurry is subjected to dissolution at a temperature and time at least sufficient to effect dissolution of substantially all of said contained titanium while vigorously stirring the slurry. The dissolved titanium is then caused to crystallize in the presence of potassium ions (e.g., KCl) to form $K_2TiF_6$, the amount of potassium ions present being at least sufficient to combine with substantially all of the dissolved titanium to form crystals of said compound.

DETAILS OF THE INVENTION

By providing proper conditions, titanium can be dissolved in the aqueous phase, probably as $H_2TiF_6$. The process is based on the fact that if potassium ions are present, added as KCl or other salts as $KNO_3$, $K_2SO_4$ etc., crystals of $K_2TiF_6$ may be precipitated out of the solution. The solubility of $K_2TiF_6$ decreases with temperature, and thus it is possible to precipitate the titanium as $K_2TiF_6$ by cooling the solution. Depending upon the crystallization conditions, either hydrated or anhydrous crystals are formed. The hydrated crystals are easily transformed into the anhydrous form by aging them in dilute HF-containing scrubber liquors.

Several variations of the process are possible depending upon the scale and nature of operation, continuous versus batch, as well as the chemical composition of the HF-containing scrubber liquor and titanium dioxide source.* The basic process and some of the possible variations are illustrated by schematic process flow diagrams in FIGS. 1, 2 and 3.

* The titanium oxide source may be a substantially pure chemical product, such as anatase, naturally occurring ores, such as ilmenite and leucoxene and concentrates thereof, and industrial by-products, such as titanium-rich slags.

FIG. 1 shows a preferred embodiment of the process in which the conversion of HF to $K_2TiF_6$ is accomplished in a single reactor, using pure anatase as a titanium source.

Scrubber liquor 10 containing HF and $H_2SiF_6$ and KCl solution 11 are fed to a cleaning step 12 where the fluosilic acid $H_2SiF_6$ reacts with KCl to form a precipitate $K_2SiF_6$. The solution is subjected to a solid-liquid separation step 13 to provide a separated sludge 14 of $K_2SiF_6$.

The cleaned solution is sent to reactor 15 to which $TiO_2$ (anatase) 16 is fed. The dilute hydrofluoric acid reacts with the titanium dioxide which in the presence of potassium ions (KCl) produces $K_2TiF_6$ The crystals are separated at step 17 to provide a spent liquor 18. The crystals of $K_2TiF_6$ 19 are aged at step 20 to which "clean" HF scrubber liquor 21 is added obtained from the solid-liquid separation step 13 in the earlier part of the flow sheet.

Following aging at step 20, the slurry is subjected to a solid-liquid separation step 22 to provide a spent age liquor 23 containing HF which is recycled to cleaning step 12. The crystallized product 24 is anhydrous and has a fairly coarse size which is desirable.

FIG. 2 shows a more generalized version of the process suitable for the continuous production of anhydrous $K_2TiF_6$ in which the titanium oxide may contain impurities.

Both KCl 25 and scrubber liquor 26 containing HF and $H_2SiF_6$ are fed to cleaning step 27, the KCl reacting with $H_2SiF_6$ to form the precipitate $K_2SiF_6$. The mixture is subjected to solid-liquid separation 28 to provide a sludge 29 of said precipitate which is disposed of.

The cleaned liquor containing HF is fed to a leaching step 30 to which $TiO_2$, possibly containing impurities is charged. The $TiO_2$ is dissolved and forms $K_2TiF_6$ in the presence of potassium ions originally added as KCl to the process stream at step 27. The residue 33 due to the impurities is separated at solid-liquid separation 32 to provide a pregnant liquor 34 which is sent to the crystallization step 35 to which further KCl 36 is added.

Following crystallization, the spent liquid 38 is separated at the solid-liquid separation step 37 to provide a micaceous type $K_2TiF_6$ 39 which is then aged at step 40 to which "clean" HF scrubber liquor 41 is added obtained from the part of the "clean" liquor removed from the liquid-separation step 28 earlier in the flow sheet. The aging to form anhydrous $K_2TiF_6$ is carried out in the presence of a dilute hydrofluoric acid solution.

Upon completion of the aging step, the anhydrous product 44 is separated at solid-liquid separation step 42, the spent liquor 43 containing HF being then recycled to cleaning step 27 as a supplemental source of HF for the leaching step.

FIG. 3 depicts an alternative crystallization scheme in which $K_2TiF_6$ is caused to crystallize directly into the anhydrous form when anhydrous $K_2TiF_6$ crystals are added as seed.

Referring to FIG. 3, pregnant leach liquor 47 is added to crystallization tank 45 along with excess KCl 46. Some method of cooling 48 is used to lower the temperature of the solution to optimize the amount of $K_2TiF_6$ crystallized. A stirrer 45A is used to assure uniform mixing of the ingredients, particularly recycle seed 53 A of $K_2TiF_6$ which is recycled from filter 50 via line 53. The stirring should be mild.

Once the anhydrous crystals have formed, a slurry 49 is removed from crystallization tank 45, passed to filter 50 to provide separated coarse crystals 52 of $K_2TiF_6$, with the fine crystals returned via recycle 53 to tank 45. The spent liquor 51 is sent to waste.

The choice of a particular flowsheet will depend on the overall economics, which are affected by the nature and size of operation, by the choice of raw materials and the process conditions selected for operation. The description of the process below illustrates the versatility of the process and also the interrelationship between the process conditions, the quality of the product, and the efficiency of the process in terms of titanium and fluorine recovery.

In the tests performed to develop the process, anatase ($TiO_2$) was used as the titanium source, potassium chloride (KCl) as the potassium salt, and scrubber liquor (4 to 6 percent HF) as the hydrofluoric acid source. However, other oxidic titanium-bearing materials from which the titanium can be dissolved in dilute hydrofluoric acid can be employed. Similarly, other potassium salts, including but not limited to $K_2SO_4$ or $KNO_3$ may be substituted for KCl. The use of more concentrated hydrofluoric acid from other sources may be employed. The use of waste dilute byproduct liquor, however, is a major advantage of the process provided by the invention. The HF concentration can range from over about 3% by weight up to as high as about 38%, e.g., about 4 to 6%.

One embodiment of the process is illustrated in FIG. 1 as previously described. The first step involves cleaning the scrubber liquor to remove any silicon which may be present. This is accomplished by using conventional technology, such as described in U.S. Pat. No. 3,178,261. A potassium salt, generally potassium chloride, is added to the as-received scrubber liquor, and the insoluble salt, $K_2SiF_6$, is precipitated as a sludge. The overall reaction at this stage is as follows:

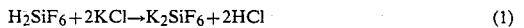

$$H_2SiF_6 + 2KCl \rightarrow K_2SiF_6 + 2HCl \qquad (1)$$

The amount of KCl added should be at least the stoichiometric requirement for reaction with both silicon and titanium, but should preferably be in the range of 5 to 30 percent excess.

The clean, KCl-containing liquor is then heated to a temperature anywhere from about 100° F. to boiling, but preferably above about 160° F. Anatase ($TiO_2$) is added to the hot liquor, which should be maintained above about 160° F. (preferably 190° F.), for 1 to 8 hours, preferably 6 hours, under vigorous agitation. As is illustrated by Example 1 hereinafter, higher temperature results in better product quality. The amount of anatase added should be adjusted such that the fluoride is in 0 to 25 percent stoichiometric excess with respect to titanium, preferably 10 percent excess. The reaction of interest is:

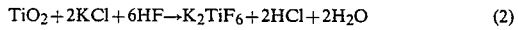

$$TiO_2 + 2KCl + 6HF \rightarrow K_2TiF_6 + 2HCl + 2H_2O \qquad (2)$$

The slurry is then cooled to ambient temperature to precipitate potassium hexafluotitanate. The final temperature is not critical; however, recovery is increased as temperature is lowered. The solubility of $K_2TiF_6$ in pure water decreases from about 30 g/L at about 100° F. to about 16 g/L at about 80° F. and to about 10 g/L at 60° F. The crystallization step is best performed under mild agitation. In some cases, the initial product may consist of a hydrated form of potassium hexafluotitanate, probably $K_2TiF_6 \cdot H_2O$. While the undesirable water of hydration may be driven off in a dryer above 32° C., the product will be too finely divided. Micaceous, hydrated crystals may, however, be converted to coarse, anhydrous crystals through an aging step, as will be apparent hereinafter.

The process described above is best suited for batch operations and for titanium-bearing materials which are totally soluble in hydrofluoric acid, such as pure anatase. However, for continuous operation or when the titanium source is such that dissolution is incomplete, or impurities such as iron, silicon, or insolubles are present, a variation of the aforementioned process may be required. In this case, it is necessary to perform titanium leaching and solution purification prior to potassium addition and crystallization. The general flowsheet for this case is shown in FIG. 2, the operating conditions being discussed in Example 2.

The dilute HF scrubber liquor is first cleaned of silicon by the conventional method using a potassium salt, preferably potassium chloride, to precipitate the $K_2SiF_6$ sludge, which is separated from the clean liquor. This silicon-free HF (or any other clean HF acid) is then used to leach titanium oxide according to the overall reaction:

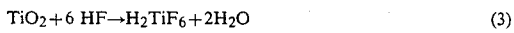

$$TiO_2 + 6HF \rightarrow H_2TiF_6 + 2H_2O \qquad (3)$$

The leach step may be performed at temperatures ranging from 130° F. to boiling, but preferably at 180° F. to boiling. As will be apparent from Example 3, higher temperature significantly improves the kinetics of titanium leaching. A stoichiometric excess of fluoride in the range of 0 to 25 percent (preferably $\geq$ 10 percent), with respect to titanium and iron should be used. The slurry is agitated vigorously for a time period of at least about 1 hour, preferably 6 hours. Using the preferred conditions, it is possible to solubilize about 99 percent of the titanium contained in anatase, and about 85 percent of that from ilmenite ore (see Examples 3 and 4). It is important to remember that some oxidic titanium materials, such as ilmenite ore, may require fine grinding to maximize dissolution in the leach step. After dissolution, if any ferric iron is present in the liquor, metallic iron or other reductant should be added to the solution to reduce it to ferrous iron so that precipitation of $K_3FeF_6$ with the final product is avoided. The insolubles are separated from the pregnant liquor by filtration or other means.

The pregnant liquor is thereafter heated to at least 180° F., preferably around 190° F., at which point a potassium salt, generally a saturated solution of potassium chloride is added. The amount of potassium addition should be in the range of 0 to 25 percent stoichiometric excess with respect to titanium and preferably in the range of 5 to 15 percent. Use of excess potassium tends to improve titanium recovery as shown by Example 5. The optimum amount will be based on economics. The liquor is then cooled under mild agitation to precipitate potassium hexafluotitanate according to the overall reaction:

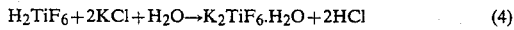

$$H_2TiF_6 + 2KCl + H_2O \rightarrow K_2TiF_6 \cdot H_2O + 2HCl \qquad (4)$$

The final temperature is not critical, but cooler temperatures provide higher titanium recoveries. Ambient temperature is recommended as a final temperature.

In this process, the initial product is potassium hexafluotitanate monohydrate, $K_2TiF_6 \cdot H_2O$, which appear to be micaceous crystals. Upon drying, the water of hydration may be driven off at 32° C. or more, but the resulting crystals are finely divided and may cause dusting problems. However, prior to drying the micaceous crystals directly, they may be converted to coarse anhydrous crystals which retain their integrity during drying. The conversion is accomplished by aging the crystals in clean scrubber liquor containing at least 2 percent HF but preferably 4 to 6 percent HF. In the presence of the fluoride ion, the monohydrate crystals lose their attached waters and recrystallize in the anhydrous form according to the following reaction:

$$K_2TiF_6 \cdot H_2O \xrightarrow{\text{excess fluoride}} K_2TiF_6 + H_2O \quad (5)$$

The aging process may require several hours or longer depending on the HF concentration. After the recrystallization is complete, the liquor may be recycled to the $TiO_2$ leach step, although it will be slightly diluted by the water picked up from the hydrated crystals. The crystal size distribution and strength may vary with HF concentration and aging time. The use of agitation during the aging process is not required, but, if used, should be mild to avoid crystal breakage. In any case, the anhydrous crystals are heavier than the hydrated crystals, and tend to settle after conversion. After solid-liquid separation the crystals may be washed with water to remove entrained liquor and dried. However, washing should be performed with a minimal amount of water to keep the redissolution of $K_2TiF_6$ crystals to a minimum.

In the process variation as described for FIG. 2 in which the potassium salt is added after titanium is leached, it is also possible to produce anhydrous $K_2TiF_6$ directly during the crystallization step, thereby avoiding the aging step. This is accomplished by adding anhydrous $K_2TiF_6$ crystal product to the reactor during the initial cooling period to act as seed for the crystallization process. That seeding of the crystallizer may promote direct formation of anhydrous $K_2TiF_6$ during crystallization is illustrated by Example 6.

The advantage of this embodiment of the process is twofold. First, an anhydrous product is directly obtained, thus eliminating the necessity of an aging step and associated equipment. Second, the fines fraction is retained as seed, and the coarse fraction is removed as product. This can be accomplished in a continuous crystallizer with recirculating slurry in which the required amount of coarse crystals (product) is removed from the bottom of the crystallizer. Alternately, a batch crystallizer can be used in which the seed is added at the beginning of the crystallization cycle. After the crystallization is complete, the product is screened and the fines are returned as seed for the next batch while the coarse fraction forms the product.

As illustrative of the various embodiments of the invention, the following examples are given.

EXAMPLE 1

The feasibility of and effect of temperature on the process illustrated in FIG. 1 for leaching soluble oxidic titanium material was demonstrated in a series of tests. For each test, 56 g of KCl was added to 600 ml of cleaned scrubber liquor containing 6.3 percent HF. This liquor was then heated to 130, 160 or 190° F., at which time 24 g of $TiO_2$ (anatase) was added. These reagent amounts represent conditions of about 10 percent excess fluoride and 25 percent excess KCl with respect to titanium. The slurries were kept at temperature under vigorous agitation for a period of 6 hours, after which they were cooled slowly under a gentle air sparge for about 18 hours. After cooling and filtration, these products did not appear micaceous, so they were not subjected to aging. The results of these tests appear in Table 1.

TABLE 1

| Effect Of Temperature On The Conversion Of $TiO_2$ to $K_2TiF_6$ | | | |
|---|---|---|---|
| Test Number | 1 | 2 | 3 |
| Maximum Temperature, °F. | 190 | 160 | 130 |
| Minimum Temperature, °F. | 75 | 75 | 75 |
| Product Analysis, % | | | |
| $K_2TiF_6$ | 99.5 | 98.4 | 96.5 |
| $TiO_2$ | 0.5 | 1.6 | 3.5 |

The results show that a good quality product containing more than 98 percent $K_2TiF_6$ could be obtained according to the tests performed at 160° or 190° F.

EXAMPLE 2

To demonstrate the feasibility of the general process in which the dissolution of titanium precedes potassium salt addition and $K_2TiF_6$ crystallization, a test was performed in which 23 g of $TiO_2$ as anatase was added to 600 ml of clean scrubber liquor containing 6.3 percent HF. The amount of HF corresponds to approximately 10 percent excess of fluoride with respect to titanium. The slurry was agitated vigorously and held at 190° F. for 6 hours. Afterward, the slurry was allowed to settle while being maintained at 190° F., and the pregnant liquor containing 23 gpl titanium was collected by decantation for use in the crystallization step. The titanium extraction in the leaching step was about 99 percent.

For the crystallization step, 400 ml of pregnant liquor was heated to 190° F., at which point 60 g of KCl in the form of a saturated solution was added. This amount of KCl represents twice the stoichiometric amount required to react with the titanium available in the liquor. The slurry was cooled to ambient temperature (75° F.) under mild stirring, during which time micaceous $K_2TiF_6 \cdot H_2O$ was precipitated. The crystals were filtered off and reslurried with 100 ml of fresh scrubber liquor and aged for 8 hours. During the aging period, the micaceous crystals were transformed to coarse, anhydrous $K_2TiF_6$ crystals. When these were filtered off, 43.3 g of $K_2TiF_6$ crystals were recovered for a titanium recovery of over 97 percent. The crystals assayed 99.1 percent $K_2TiF_6$. The silicon analysis of the final product was 0.003 percent. The particle size distribution of the final product is given in Table 2.

TABLE 2

| Particle Size Distribution Of $K_2TiF_6$ Product | | |
|---|---|---|
| Size, Mesh | Weight | Percent |
| +65 | 0.8 | 1.9 |
| −65/+100 | 19.8 | 46.4 |
| −100/+150 | 12.4 | 29.0 |
| −150/+200 | 5.9 | 13.9 |
| −200 | 3.7 | 8.8 |
| TOTAL | 42.6 | 100.0 |

About half of the material produced was +100 mesh, which should be sufficient for most applications. Particle sizes can be increased by lengthening the aging time or varying the fluoride strength of the age liquor.

EXAMPLE 3

An additional series of tests was performed to determine the effect of temperature on the leaching of titanium oxide. About 23 grams of anatase were leached with 600 ml of clean scrubber liquor containing 6.3 percent HF. This corresponds to a 10 percent excess of HF. Samples of solution were taken at predetermined time intervals and analyzed for titanium. These data were used to calculate the percent leaching of titanium under various conditions. The results are summarized in Table 3.

TABLE 3

Effect of Temperature on the Kinetics of Anatase Leaching

| Test Number | 1 | 2 | 3 | 4 |
|---|---|---|---|---|
| Leaching temperature, °F. | 100 | 130 | 150 | 190 |
| Titanium Leached, percent | | | | |
| 1 hour | 2.2 | 17.5 | 45.9 | 95.7 |
| 2 hours | 6.6 | 45.9 | 76.4 | 95.7 |
| 3 hours | 15.3 | 61.1 | 87.3 | 97.9 |
| 4 hours | 21.8 | 74.2 | 91.7 | 95.7 |
| 5 hours | 30.6 | 81.6 | 93.9 | 97.9 |
| 6 hours | 48.3 | 86.1 | 96.1 | 99.7 |

The results show that the dissolution can be accomplished at any temperature, however, the higher temperatures result in increased dissolution and shorter residence times.

EXAMPLE 4

To demonstrate the effect of excess KCl on the titanium recovery during the crystallization step, three tests were performed using the procedure described in Example 2, but using 0, 25, and 50 percent excess KCl. The results are listed in Table 4.

TABLE 4

Effect of Stoichiometric Excess of KCl Addition During $K_2TiF_6$ Crystallization on Titanium Recovery

| | A | B | C |
|---|---|---|---|
| Crystallization Conditions | | | |
| Maximum temperature, °F. | 190 | 190 | 190 |
| Minimum temperature, °F. | 75 | 75 | 75 |
| KCl addition, g | 30 | 37.5 | 45 |
| Excess KCl, % | 0 | 25 | 50 |
| Aging time, hr | 8 | 8 | 8 |
| Results | | | |
| Product weight, g | 38.6 | 43.1 | 43.7 |
| Assay, % $K_2TiF_6$ | 99.0 | 99.6 | 99.4 |
| Titanium recovery, % | 82.9 | 96.9 | 97.9 |

The results show that the use of 25 percent excess KCl or greater enhances titanium recovery significantly, but no marked advantage in recovery is gained by increasing the level above 25 percent. It is likely that using somewhat lower levels of excess KCl will provide similar titanium recovery. The preferred range of excess KCl is probably 5 to 15 percent.

EXAMPLE 5

A test was performed using the process described in Example 2 to demonstrate the feasibility of producing $K_2TiF_6$ using ilmenite ore and dilute HF. In this case, 31 g of crushed ilmenite ore, assaying 36 percent titanium, 24.3 percent iron (mostly $Fe^{+3}$) and 0.19 percent silicon was leached with 575 ml of clean scrubber liquor, containing 6.3 percent HF. The slurry was agitated vigorously at 190° F. for 3 hours. Iron powder, 7 g, was also added to insure that iron in solution was reduced to the ferrous state. After solid-liquid separation to remove insolubles, the pregnant liquor contained 16 g/L titanium and 24.5 g/L iron. Titanium extraction was about 85 percent in this step. After crystallization with potassium chloride, the $K_2TiF_6$ product was observed to be coarse and was found to contain only 0.03 percent iron.

EXAMPLE 6

The feasibility of using anhydrous $K_2TiF_6$ seeds in the crystallization step to circumvent the formation of micaceous $K_2TiF_6.H_2O$ is illustrated in this example. In this case, 400 ml of pregnant liquor containing 20 g/L titanium was prepared from anatase and scrubber liquor and heated to 190° F. Then, 22.6 grams of KCl, in the form of a saturated solution, was added to the hot liquor. The liquor was then cooled slowly under mild agitation to ambient temperature. The reactor was seeded with 20 g of anhydrous $K_2TiF_6$ crystals prior to reaching 180° F. After cooling, the slurry was filtered and the crystals washed with 100 ml water. The crystals were observed to be non-micaceous, so they were not subject to an aging step. Chemical analysis confirmed that the crystals were anhydrous and assayed 98.7 percent $K_2TiF_6$.

In summary, the invention provides various embodiments for recovering HF from dilute solution, such as waste solutions derived from the treatment of phosphates. Such solutions may contain about 3% to about 38% by weight of HF and generally about 4% to 6% by weight of HF.

Broadly speaking, the temperature for dissolving the titanium material may range from about 100° F. to boiling, for example, from about 130° F. to 190° F., preferably from about 160° F. to 190° F.

By using such dilute solutions of HF, the fluorine can be recovered in the form of a commercially useful product of $K_2TiF_6$ obtained by using the acid to leach oxidic titanium material, such as $TiO_2$, ilmenite or mixtures thereof. The oxidic titanium material may contain at least about 25% by weight of titanium. The product finds particular use as a grain refining addition agent in the production of aluminum alloys, the contained titanium being the refining agent.

The various embodiments disclosed herein enable the dissolution of substantially all of the titanium contained in the oxide material, the term "substantially all" meaning at least about 80% of the contained titanium.

Where the waste solution contains impurities, such as silicon in the form of $H_2SiF_6$, the impurity can be easily removed early in the process by adding potassium ions to precipitate $K_2SiF_6$. The presence of potassium ions is also essential in combining with titanium and fluorine ions to form $K_2TiF_6$. Any source of potassium ions may be used, such as ions obtained from such soluble salts of KCl, $K_2SO_4$ and $KNO_3$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for the recovery of fluorine from waste solutions of dilute aqueous hydrofluoric acid and for the production of a commercially useful product of $K_2TiF_6$ which comprises,
    providing a waste solution of said dilute hydrofluoric acid containing silicon in the form of $H_2SiF_6$ as in impurity,
        the amount of HF in said solution ranging from about 3% to about 38% by weight, adding to said solution a source of potassium ions at least stoichiometrically sufficient to precipitate said silicon as $K_2SiF_6$ and stoichiometrically sufficient for the subsequent production of $K_2TiF_6$, separating said precipitated $K_2SiF_6$ from said solution to provide a substantially clean waste solution, mixing said clean waste solution with an amount of an oxidic titanium material containing about 25% to 60% by weight of titanium to form a slurry thereof, the amount of HF in said solution being at least stoichiometric to the amount of titanium present and ranging up to about 25% of stoichiometric excess sufficient to effect the dissolution of said titanium-containing material, subjecting said contained titanium material to dissolution at a temperature ranging from about 100° F. to boiling in the presence of said potassium ions while vigorously stirring said slurry at a temperature within said range for a time at least sufficient to effect dissolution of substantially all of said contained titanium and form a pregnant liquor thereof, causing said titanium to crystallize from said solution as $K_2TiF_6$ by cooling to ambient temperature, and then separating said solution from said crystals of $K_2TiF_6$.

2. The process of claim 1, wherein the temperature ranges from about 130° F. to boiling.

3. The process of claim 1, wherein the amount of HF in the waste solution ranges from about 4% to 6% by weight.

4. The process of claim 1, wherein following the recrystallization of $K_2TiF_6$, the crystals are aged in the presence of a dilute solution of hydrofluoric acid for a time sufficient to produce substantially coarse anhydrous crystals of said $K_2TiF_6$.

5. The process of claim 1, wherein the dissolved titanium is caused to crystallize as coarse anhydrous $K_2TiF_6$ by adding seed $K_2TiF_6$ to the pregnant liquor during crystallization of $K_2TiF_6$ from said pregnant liquor.

6. The process of claim 1, wherein said oxidic titanium material is selected from the group consisting of $TiO_2$ and ilmenite.

7. A process for the recovery of fluorine from waste solutions of dilute hydrofluoric acid and for the production of a commercially useful product of $K_2TiF_6$ which comprises, providing a waste solution of said dilute hydrofluoric acid containing silicon as an impurity in the form of $H_2SiF_6$, the amount of HF in solution ranging from about 3% to about 38% by weight, adding to said solution a source of potassium ions at least stoichiometrically sufficient to precipitate said silicon as $K_2SiF_6$ and stoichiometrically sufficient for the subsequent production of $K_2TiF_6$, separating said precipitated $K_2SiF_6$ from said solution to provide a substantially clean waste solution, mixing said clean waste solution with an amount of an oxidic titanium material containing about 25% to 60% by weight of titanium and containing insolubles as impurities, the amount of HF in said solution being at least stoichiometric to the amount of titanium present and ranging up to about 25% of stoichiometric excess sufficient to effect the dissolution of said titanium-containing material, subjecting said contained titanium material to dissolution at a temperature ranging from about 130° F. to boiling in the presence of said potassium ions while vigorously stirring said slurry at a temperature within said range for a time ranging from about 1 to 8 hours sufficient to effect dissolution of substantially all of said contained titanium and form a pregnant liquor thereof and an insoluble residue, separating said pregnant liquor from said insoluble residue, causing said titanium to crystallize from said solution as $K_2TiF_6$ by cooling to ambient temperature, and then separating said solution from said crystals of $K_2TiF_6$.

8. The process of claim 7, wherein the amount of HF in the waste solution ranges from about 4% to 6% by weight.

9. The process of claim 7, wherein following the recrystallization of $K_2TiF_6$, the crystals are aged in the presence of a dilute solution of hydrofluoric acid for a time sufficient to produce substantially coarse anhydrous crystals of said $K_2TiF_6$.

10. The process of claim 7, wherein the dissolved titanium is caused to crystallize as coarse anhydrous $K_2TiF_6$ by adding seed $K_2TiF_6$ to the pregnant liquor during crystallization of $K_2TiF_6$ from said pregnant liquor.

11. The process of claim 24, wherein said oxidic titanium material is selected from the group consisting of $TiO_2$ and ilmenite.

* * * * *